United States Patent [19]

Teets

[11] Patent Number: 4,602,897
[45] Date of Patent: Jul. 29, 1986

[54] CUTTING INSERT AND GROOVING CUTTER

[75] Inventor: Bradley Teets, Budd Lake, N.J.

[73] Assignee: Iscar Metals, Inc., Hackettstown, N.J.

[21] Appl. No.: 603,766

[22] Filed: Apr. 25, 1984

[51] Int. Cl.$^4$ .......................... B23B 27/00; B23C 5/00
[52] U.S. Cl. ...................................... 407/113; 407/42; 407/103
[58] Field of Search ............................... 407/113–117, 407/120, 42, 103

[56] References Cited

U.S. PATENT DOCUMENTS

| D. 216,074 | 11/1969 | Hood | 407/113 |
|---|---|---|---|
| 1,926,531 | 9/1933 | Graham | 407/99 |
| 2,248,931 | 7/1941 | Anania | 407/113 |
| 2,907,099 | 11/1959 | Dow | 29/98 |
| 3,475,802 | 11/1969 | Kollar | 407/113 |
| 3,520,042 | 7/1970 | Stier | 29/98 |
| 3,568,284 | 3/1971 | Lunden et al. | 407/113 |
| 3,613,197 | 10/1971 | Stier | 29/95 |
| 3,762,005 | 11/1973 | Erkfritz | 29/95 |
| 3,813,746 | 6/1974 | Price | 29/96 |
| 4,028,782 | 6/1977 | Stansak | 29/95 |
| 4,169,690 | 11/1979 | Kendra | 407/90 |
| 4,271,882 | 6/1981 | Valo | 144/241 |
| 4,360,297 | 11/1982 | Weber | 407/113 |
| 4,364,693 | 12/1982 | Lindsay | 407/106 |
| 4,433,948 | 2/1984 | Kodama | 407/113 |

FOREIGN PATENT DOCUMENTS

| 1442774 | 5/1966 | France | 407/113 |
|---|---|---|---|
| 4743270 | 11/1972 | Japan | 407/113 |
| 1567004 | 5/1980 | United Kingdom | 407/113 |

Primary Examiner—Francis S. Husar
Assistant Examiner—Jerry Kearns
Attorney, Agent, or Firm—Ronald G. Goebel

[57] ABSTRACT

A cutting insert and, in one embodiment, a grooving cutter, is formed so that multiple cutting edges are disposed in the cutting path. Rectangular cutting inserts and radial cutting inserts are contemplated. The rectangular shape is most suited for small tools and equally so for internal applications. Multiple radial cutting inserts can be mounted equally radially disposed, but differently angularly disposed from each other, for providing a grooving cutter. The cutting inserts and tool assemblies thereof may be used for OD grooving, threading, relieving, trepanning, face grooving, slotting and milling.

8 Claims, 18 Drawing Figures

CUTTING INSERT AND GROOVING CUTTER

FIELD OF THE INVENTION

This invention relates to cutting inserts. In one specific aspect, this invention also relates to a grooving cutter.

BACKGROUND AND DISCUSSION OF THE PRIOR ART

Heretofore it was known in the prior art to provide a cutting insert with angularly disposed similar cutting edges such as is disclosed in:

Weber—U.S. Pat. No. 4,360,297
Erkfritz—U.S. Pat. No. 3,762,005
Stier—U.S. Pat. No. 3,520,042
Stier—U.S. Pat. No. 3,613,197
Price—U.S. Pat. No. 3,813,746
Kendra—U.S. Pat. No. 4,169,690
Stansak—U.S. Pat. 4,028,782
Dow—U.S. Pat. No. 2,907,099
Valo—U.S. Pat. No. 4,271,882

It was also known in the prior art to rotatably mount a plurality of cutting elements on the periphery of a tool holder as shown in U.S. Pat. No. 3,568,284 granted Mar. 9, 1971 to Lunden et al.

For any given size prior art cutting insert, the effective cutting edge was rather limited.

It is therefore a principal object of the present invention to provide multiple effective cutting edges on cutting inserts.

It is another object of the present invention to provide a cutting insert as aforesaid which can be repositioned on a holder to provide different similar sets of cutting edges.

It is still another object of the present invention to provide a cutting insert as aforesaid in combination with novel seating and mounting elements.

It is a further object of the present invention to provide an insert as aforesaid which may be mounted around the periphery of a tool holder to provide a novel grooving cutter.

It is a further object of the present invention to provide cutting inserts as aforesaid which are of practical design and construction and are inexpensively manufactured, and yet achieve the intended applications.

SUMMARY OF THE INVENTION

A cutting insert is formed with a rectangular, generally two lobe shape or as a radial, generally three lobe shape. Each lobe is provided with multiple corner cutting edges formed from specifically shaped and tapered wall surfaces forming the edges. A central body mounting portion is common to the multiple lobes so as to reduce the non-essential mass of the insert. Multiple inserts may be non-rotatably, differently angled, peripherally mounted in a holder to provide a grooving cutter.

DESCRIPTION OF THE PREFERRED EMBODIMENTS

Figure 6:
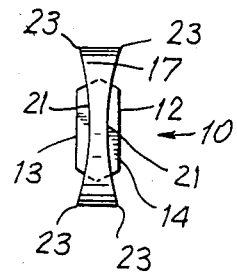
FIG. 6 is a side elevational view of the cutting insert of FIG. 5.
Figure 8:
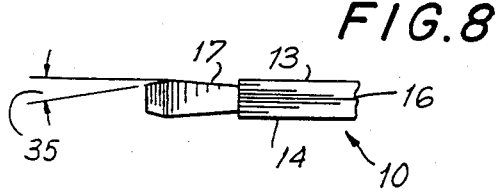
FIG. 8 is a partial front elevational view taken along line 8—8 of FIG. 5.
Figure 7:
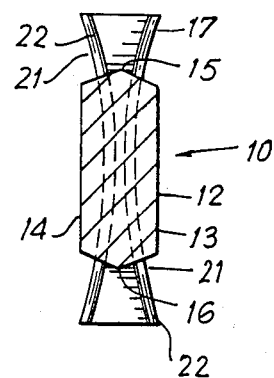
FIG. 7 is a sectional view taken along line 7—7 of FIG. 5.

Referring to FIGS. 1–3 and 5–8, there is shown rectangular cutting insert 10 mounted in holder 11. Insert 10 is formed with a central portion 12 having top and bottom surfaces 13 and 14 and oppositely disposed V-shaped sides 15 and 16, for purposes hereinafter appearing. A pair of similar lobes or cutting body portions 17 are formed with and disposed at opposite ends of central portion 12. Each body portion 17 is formed with a flat rear face 18, opposite disposed concave sides 19 (FIG. 5) and an arcuately curved forward cutting face 20, which face tapers rearwardly and sidewardly (FIGS. 6 and 8). Oppositely disposed concave top and bottom surfaces 21 complete the assembly. Surfaces 21 are also rearwardly tapered, as best shown at 22 (FIGS. 7 and 8). By this manner of construction, four corner cutting edges 23 are provided on each lobe 17.

Holder 11 is specifically designed for the mounting of insert 10, and is formed of a generally cylindrical housing 24 having partial top surface 25. Opposed mounting clamps 26 and 27 are provided, which each clamp having opposed interior V-surfaces 26a and 27a for the cooperative mounting of sides 15 and 16 of the cutting insert central portion 12. Clamps 26 and 27, as well as housing 24 are formed with a coincident screw through hole 28 for receiving clamp screw 29. Surface 25 mates with interior specifically contoured convex surfaces 31 which cooperatively flush fit with sides 19. In this manner of construction, with the tightening of the clamp screw, the cutting insert is seated within the clamp with two sides 19 flush seated to sides 31, and rear faces 18 flush seated to clamp sides 32.

In cutting a groove with the cutting insert 10-holder 11 assembly, a groove depth of 34 is formed with stationary mounting of the holder and rotation of a workpiece relative to the cutting corners.

Figure 1:
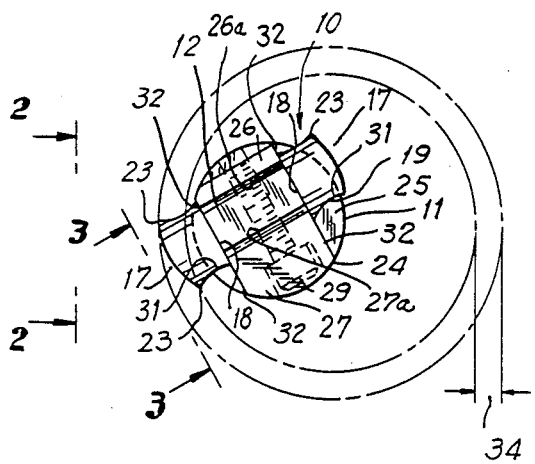
FIG. 1 is a plan view of one embodiment of the rectangular insert mounted in a holder.
Figure 2:
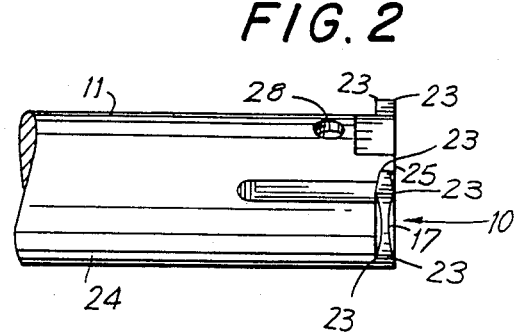
FIG. 2 is the elevational view taken along line 2—2 of FIG. 1.
Figure 3:
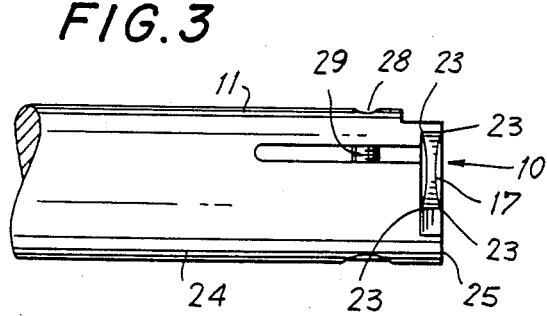
FIG. 3 is the elevational view taken along line 3—3 of FIG. 1.
Figure 4:
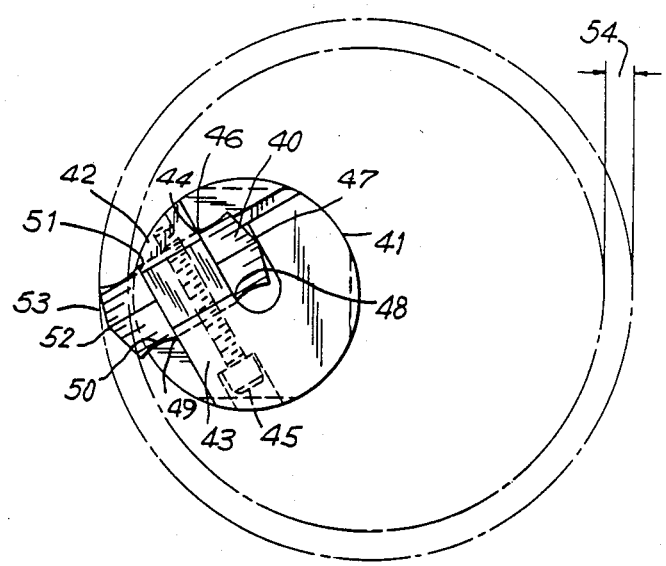
FIG. 4 is a plan view of another embodiment of a cutting insert.
Figure 5:
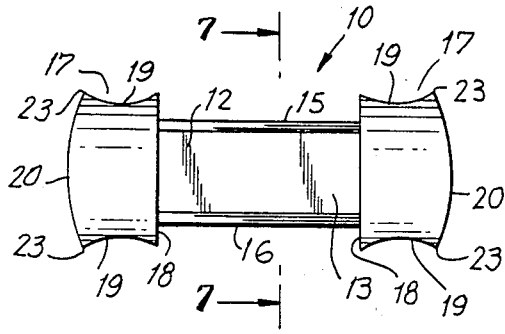
FIG. 5 is an enlarged plan view of the cutting insert of FIG. 1.

Referring now specifically to FIG. 4, there is shown another 2-lobe cutting insert embodiment 40 mounted in generally cylindrical housing holder 41. Clamp portions 42 and 43 retain the V-shaped sides 44 of cutting insert 40. Clamp screw 45 contacts insert 40 at surfaces 46, 47, 48, 49, 50, and 51, and seats insert 40 at 47, 49 and 51. Insert 40 is formed with additional cutting corners 52 at cutting face 53. This insert 40-holder 41 design permits large bore diameter cuts with groove depths as shown at 54.

Figure 9:
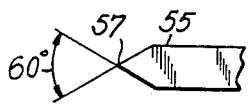
FIG. 9 is a partial front elevational view of the cutting insert edge of an alternate cutting edge shape.
Figure 10:
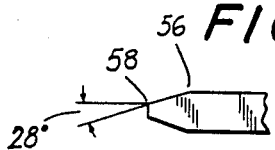
FIG. 10 is a partial front elevational view of the cutting insert edge of an alternate cutting edge shape.

Referring now specifically to FIGS. 8-10, there are shown respective inserts 10, 55 and 56. Insert 10 shows a corner edge cutting shape having a very acute angle 35 while cutting corner 57 of insert 55 shows a 60° angle shape, and corner 58 of insert 56 shows a 28° angle shape. Other shapes are also within the contemplation of this invention.

Figure 11:
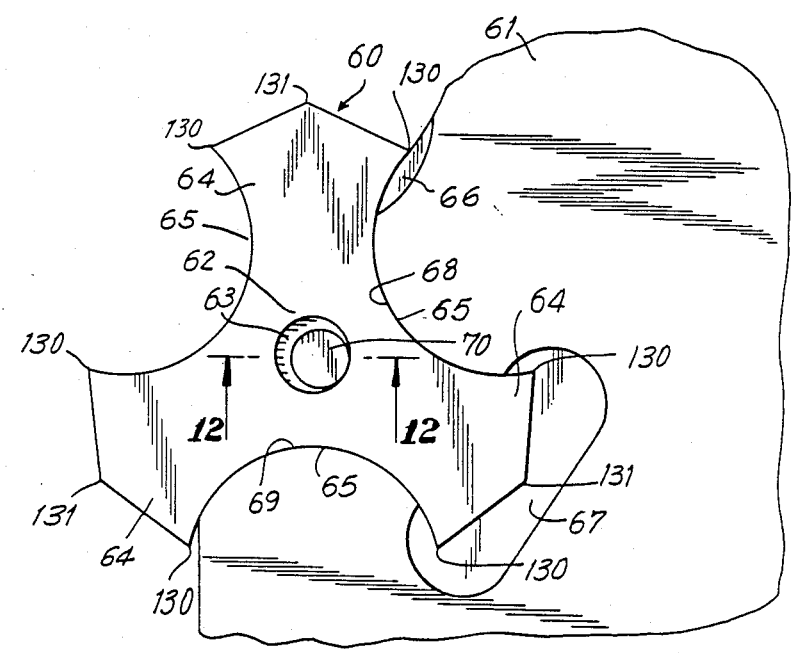
FIG. 11 is a schematic illustration of one embodiment of the radial cutting insert in one mounting assembly embodiment.
Figure 12:
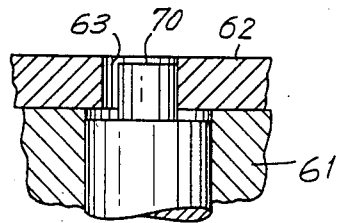
FIG. 12 is a fragmentary sectional view taken along line 12—12 of FIG. 11.

Referring now specifically to FIGS. 11 and 12, there is shown a 3-lobe or 3-body radial cutting insert 60, mounted in holder 61 (partially shown). Insert 60 is shown only schematically and this form of embodiment will be discussed in further detail in connection with the similar embodiment of FIGS. 14 and 15. Insert 60 is formed with central portion 62 having central axial through hole 63. Three similar lobes or body portions 64 are formed on and with central portion 62. Each lobe is formed with three sets of cutting corners, namely side cutting corners 130 and central cutting corners 131. The lobes are formed with concave connecting side surfaces 65. Holder 61 is formed with partial cut-out recess 66, and full cut-out 67, as well as convex seating surfaces 68 and 69. A cam pin 70 is mounted with axial through hole 63 of the holder. In seating the insert, one lobe is partially disposed in recess 66, while another part is disposed in the cutting path, while a second lobe is fully seated within recess 67, and the third lobe is also partially in the cutting path. The cam pin action is provided for in relative movement of the cutting corners of the lobe portions with the workpiece. It is of course understood that those cutting corners of the lobe outside the cutting path (e.g., in recesses 66 and 67) can be used in a subsequent reverse mounting of the cutting insert.

Figure 15:
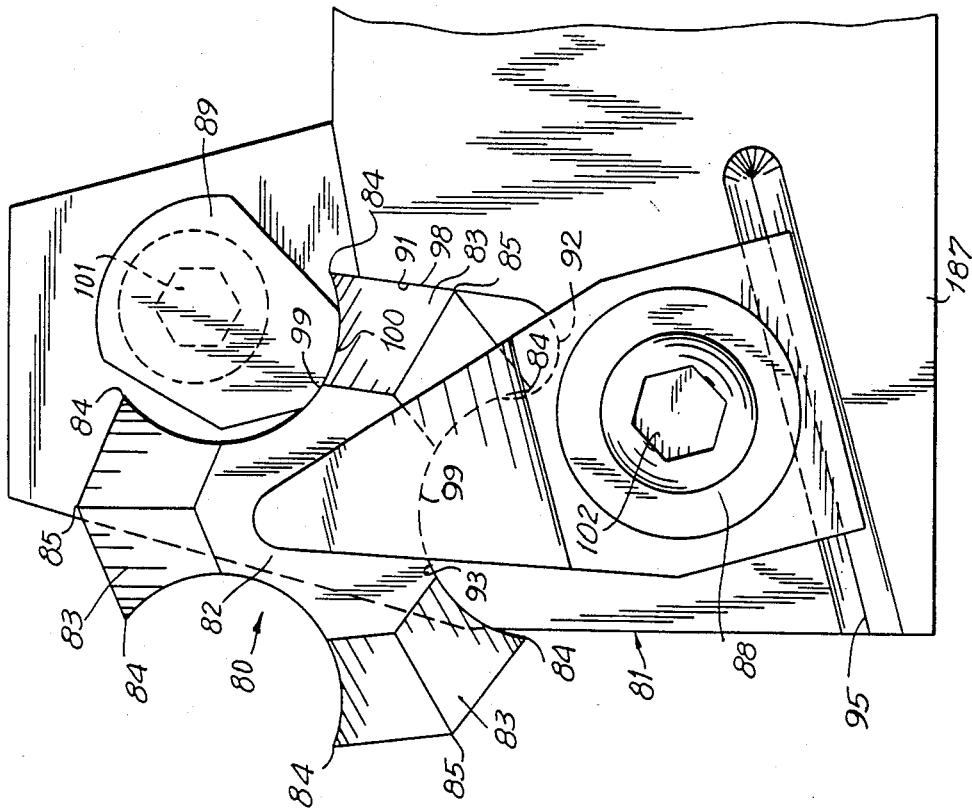
FIG. 15 is a top plan view of FIG. 14.
Figure 14:
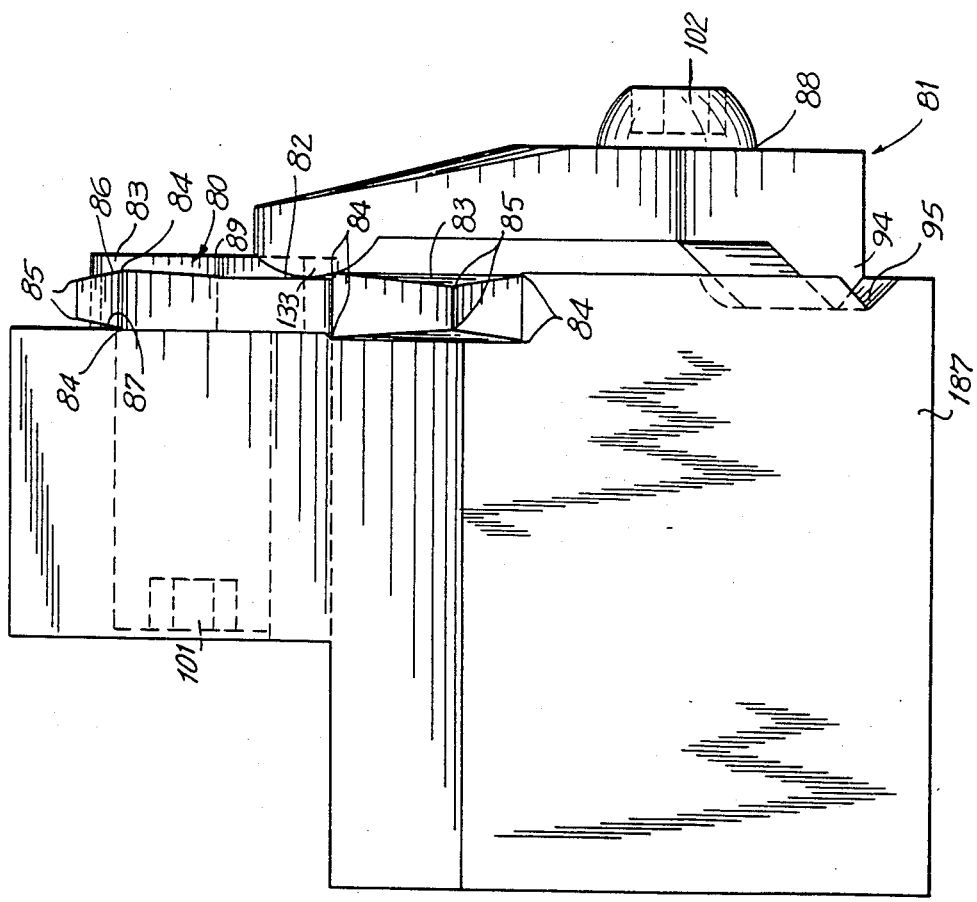
FIG. 14 is a side elevational view of the radial cutting insert of FIG. 11 in another mounting assembly embodiment.

Referring to FIGS. 14 and 15, there is shown a 3-lobe radial cutting insert 80 mounted in holder 81. Insert 80 is formed with central portion 82 and three equi-angularly (180°) disposed similar lobes or body portions 83. Each lobe 83 is formed with two sets of outside cutting corners 84 and forward face central cutting corners 85. It is noted that top and bottom edges 86 and 87 taper upwardly ahd outwardly from corners 85. Concave sides 99 complete the design of the lobes.

Holder 81 is generally formed of a housing 187 and two clamp members 88 and 89. In addition, housing 187 is formed of specifically contoured raised contiguous surfaces 91, 92 and arcuately curved surface 93, for purposes hereinafter appearing. Clamp 88 is formed at one end with a V-wedge 94 which slidably engages and seats within V-groove 95 of housing 187. Clamp 88 is formed at the other end with ball-shaped bearing member 133 which pressingly engages central portion 82 of the insert. Screw clamp assembly 102 pressingly holds clamp 88 into V-groove 95. At the other end of clamp 88, arcuately shaped member 133 pressingly engages the central portion 82 of the insert. The insert itself is seated with cutting face 98 seated against surface 91, and one concave side 99 seated against surface 93. Clamp 89 is formed at one end with curvilinear side surface 100 which pressingly engages another concave surface 99 of the insert. Screw clamp assembly 101 of clamp 89 holds surfaces 99 and 100 in mating relationship. Screw clamp assembly 102 holds 133 and 94 in pressing engagement. This manner of insert mounting and holding provides a secure seating of the insert for heavy-duty cutting.

Figure 13:
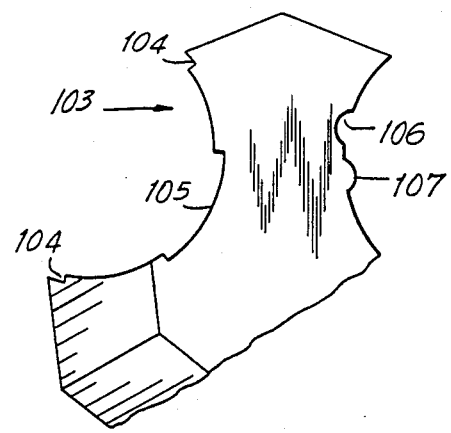
FIG. 13 is a fragmentary plan view of an alternate embodiment of a radial cutting insert.

Referring now to FIG. 13 only, there is shown the radial cutting insert 103 with certain modifications, namely, the presence of shelf-type chip breakers 104. In addition, female ridges such as 105 and 106, and male ridges such as 107 may be provided along the adjoining respective rake faces to further deflect the chip. In most shallow grooving applications, few chips are produced as chip breakers are not normally required. Tests have shown that steel curls quickly away from the immediate adjacent cutting edge.

Figure 16:
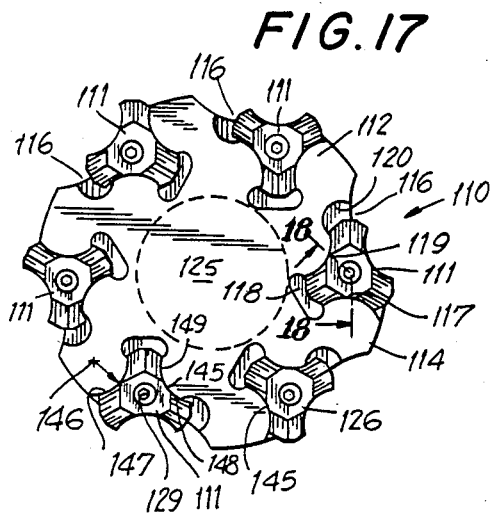
FIG. 16 is a side elevational view of a grooving cutter with a plurality of radial cutting inserts mounted therein.
Figure 17:
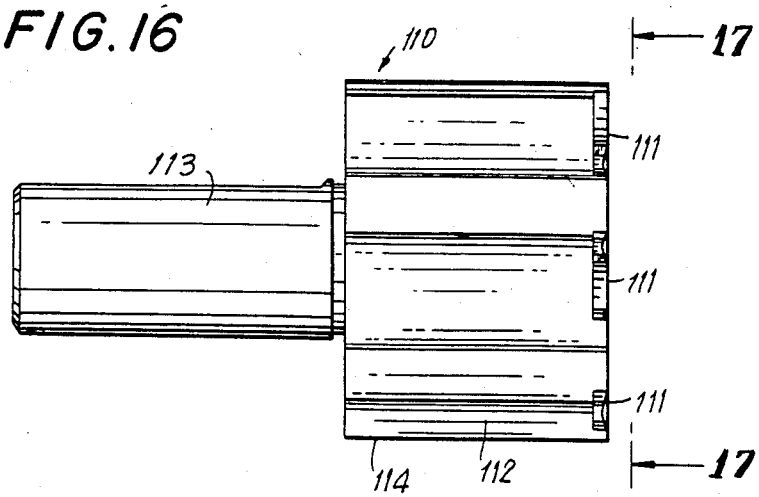
FIG. 17 is a plan view taken along line 17—17 of FIG. 16.
Figure 18:
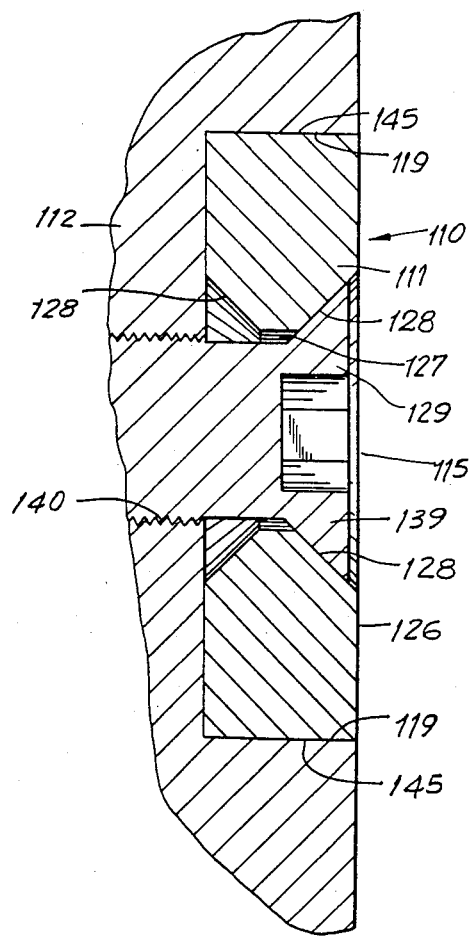
FIG. 18 is an enlarged fragmentary sectional view taken along line 18—18 of FIG. 17.

Referring now to FIGS. 16-18, there is shown a grooving cutter or tool 110 utilizing a plurality of six radially disposed 3-lobe radial cutting inserts 111. Individual inserts 111 are similar in design and construction to those described in connection with the aforesaid 3-lobe radial embodiments, except as distinguished hereinafter. Inserts 111 are mounted in housing 112, which housing generally is formed of shank 113, generally cylindrically body portion 114 integrally connected to the shank, and six insert screw mount assemblies 115. Six pockets or recesses 116 are provided with each pocket being formed with a first arcuately shaped seat or surface 117, a full cut-out recess 118, a second arcuately shaped seat surface 119 and a partial cut-out or recess 120, for cooperatively seatably receiving the individual inserts 111, as more fully discussed hereinafter. It is most important to note that each seating pocket and concommitantly each insert, is differently angularly disposed with respect to each other, although equiangularly disposed with respect to axis 125. In mounting the inserts in this manner, a progression of multiple cutting edges is provided in the cutting path.

Each central portion 126 of each insert 111 is formed with a dual through-hole 127 having a dual counter-sink 128. A flathead screw 129 seats the central portion. This expedient makes for ready seating and reversal of the cutting insert to utilize all the cutting corners of all the lobes. In holding the insert, flat head screw 129 passes through hole 127, and the cone 139 of the screw mates with one of the counter-sunk surfaces 128. The tapped hole 140 in the housing 112 is off center slightly from the center or axis of the insert. As the screw is threaded into the tool, housing 112, it pulls the insert closer to the seating pocket 116 and draws the insert down so that the middle of the arcuately shaped side surface 145 of the insert contacts surface 119. This prevents the insert from rotating with respect to axis 146. The insert is thus supported at all times at point 147 by the cutting force and afore-described action of screw 129. Under normal cutting loads, point 148 will act as the third point of contact. That is, three point contact is maintained, namely, points 147, 148 and the screw 129 under normal loads and points 147, 149 and the screw 129 under adverse loads. The flush mounting of the screw head cone 139 with the side of the insert allows grooving very close to shoulders.

Tool 110 is particularly suited for slot milling. More specifically, tool 110 would typically be used for milling a large diameter snap ring or O-ring groove.

It will be seen from the foregoing that there has been provided a new and improved type of cutting insert with improved cutting edges and with maximum utilization of the mass of the cutting insert.

Further it will be seen how multiple cutting inserts may be seated and mounted for slot milling or groove cutting.

Finally, it has been shown that the shape and design of the cutting insert permits ready manufacture by powder metal hot pressing techniques as well as other conventional methods of manufacture.

While a full and complete description of the invention has been set forth in accordance with the dictates of the Patent Statutes, it is to be understood that the invention is not intended to be limited to the specific embodiments herein shown. Accordingly, modification of the invention may be resorted to without departing from the spirit hereof or the scope of the appended claims.

What is claimed is:

1. A cutting insert comprising:
   (a) a central portion; and
   (b) a pair of cutting body portions disposed at opposite ends of said central portion; each body portion having a flat rear face facing said central portion, oppositely disposed concave side faces, an arcuately curved forward cutting face tapering rearwardly and sidewardly and oppositely disposed concave top and bottom surfaces tapered rearwardly whereby four corner cutting edges are formed on each body portion each corner cutting edge being formed by the intersection of one side of said concave side face, one side of said arcuately curved forward cutting face and one side of a concave top or bottom surface.

2. The cutting insert of claim 1 wherein said central portion has oppositely disposed V-shaped sides.

3. A cutting tool comprising:
   (a) a holder formed of a cylindrical housing having opposed mounting clamps, each clamp having opposed interior V-surfaces and said housing and said clamp being provided with a coincident screw throughhole and a clamp screw threadable thereon; and
   (b) a cutting insert inserted in said holder comprising a central portion having oppositely disposed V-shaped sides which are mountably engaged by said opposed interior V-surfaces of each of said clamps and said clamp screw, said insert further including a pair of cutting body portions disposed at opposite ends of said central portion; each body portion having a flat rear face facing said central portion, oppositely disposed concave side faces, an arcuately curved forward cutting face tapering rearwardly and sidewardly, and oppositely disposed concave top and bottom surface tapered rearwardly whereby four corner cutting edges are formed on each body portion, each corner cutting edge being formed by the intersection of one side of said concave side face, one side of said arcuately curved forward cutting face and a concave top or bottom surface.

4. A cutting insert comprising:
   (a) a central portion; and
   (b) three cutting body portion extending outwardly of said central portion spaced substantially equally apart, each body portion having a pair of side cutting corners having two side cutting edges formed therebetween and central cutting corners located outwardly of the side cutting corners having a central cutting edge formed therebetween and a concave side surface between each body portion having side edges, said central cutting edge and each side cutting edge being connected by a connecting edge which tapers inwardly to said central cutting edge, each central cutting corner being formed by the intersection of a connecting edge at the central portion of said body portion and each side cutting corner being formed by the intersection of a connecting edge and a side edge of said concave side surface.

5. The cutting insert of claim 4 having a central throughhole located therein.

6. A cutting tool comprising:
   (a) a holder for said cutting insert having an outer edge, a partial cut-out recess, a full cout-out recess located about 120° apart from said partial cut-out recess, a convex seating surface located between said partial cut-out recess and said full cut-out recess and between said full cut-out recess and said outer edge; and a cam pin centrally located in said holder; and
   (b) a cutting insert inserted in said holder comprising a central portion having a central throughhole through which said cam pin extends and three cutting body portions extending outwardly of said central portion spaced substantially equally apart, each body portion having a pair of side cutting corners having two side cutting edges formed therebetween and central cutting corners located outwardly of the side cutting corners having a central cutting edge formed therebetween and a concave side surface between each body portion having side edges, said central cutting corners and said side cutting corners being connected by connecting edges, each central cutting corner being formed by the intersection of a connecting edge at the central portion of said body portion and each side cutting corner being formed by the intersection of a connecting edge and a side edge of said concave side surface, one cutting body portion being partially disposed in said partial cut-out recess, a second cutting body portion being disposed in said full cut-out recess, said third body portion being disposed outside said holder and said convex seating surfaces of said holder engaging said concave side surface of said insert.

7. A cutting tool comprising:
   (a) a holder having a housing with a groove formed in said housing, a first clamp means securable with said holder having formed therein a wedge fittable in said groove of said housing, a downwardly protruding arcuately-shaped member, and a second clamp means securable with said holder having a curvilinear side surface; and
   (b) a cutting insert secured in said holder having a central portion and three cutting body portions extending outwardly of said central portion spaced substantially equally apart, each body portion having a pair of side cutting corners having two side cutting edges formed therebetween and central cutting corners located outwardly of the side cutting corners having a central cutting edge formed therebetween and a concave side surface between each body portion having side edges, said central cutting corners and said side cutting corners being connected by connecting edges, each central cutting corner being formed by the intersection of a connecting edge at the central portion of said body portion and each side cutting corner being formed by the intersection of a connecting edge and a side edge of said concave side surface, said downwardly protruding member of said holder engaging said central portion and said curvilinear side surface of said holder engaging a concave side surface of said body portion of said cutting insert.

8. A cutting tool comprising:
(a) a housing including a shank having a central axis, a cylindrical body portion connected with said shank, and a plurality of insert mount assemblies located circumferentially about said shank, each assembly having a pocket formed with a first arcuately shaped seat a full cut-out recess, a second arcuately shaped seat and a partial cut-out recess, each seating pocket being differently angularly disposed with respect to each other and equiangularly disposed with respect to said shank central axis; and
(b) a cutting insert inserted in each of said insert mount assemblies, each insert having a central portion formed with a central throughhole and means for securing said insert to said housing through said throughhole, said insert having three cutting body portions extending outwardly of said central portion spaced substantially equally apart, each body portion having a pair of side cutting corners having two side cutting edges formed therebetween and central cutting corners located outwardly of the side cutting corners having a central cutting formed therebetween and a concave side surface between each body portion having side edges, said central cutting corners and said side cutting corners being connected by connecting edges, each central cutting corner being formed by the intersection of a connecting edge at the central portion of said body portion and each side cutting corner being formed by the intersection of a connecting edge and a side edge of said concave side surface, one cutting body portion being partially disposed in said partial cut-out recess, a second cutting body portion being disposed in said full cut-out recess, said third body portion being disposed outside said housing and said arcuately shaped side surface of said housing engaging said concave side surface of said insert.

* * * * *